United States Patent
Ojanen et al.

(10) Patent No.: US 7,499,600 B2
(45) Date of Patent: Mar. 3, 2009

(54) METHOD FOR CHARACTERIZING A DIGITAL IMAGING SYSTEM

(75) Inventors: Harri J. Ojanen, Helsinki (FI); Ari Tervonen, Vantaa (FI)

(73) Assignee: Nokia Corporation, Espoo (FI)

( * ) Notice: Subject to any disclaimer, the term of this patent is extended or adjusted under 35 U.S.C. 154(b) by 836 days.

(21) Appl. No.: 10/853,005

(22) Filed: May 25, 2004

(65) Prior Publication Data

US 2005/0276513 A1    Dec. 15, 2005

(51) Int. Cl.
G06K 9/48   (2006.01)
G06K 9/40   (2006.01)
G06K 9/32   (2006.01)
G01M 11/00  (2006.01)

(52) U.S. Cl. .................. 382/275; 382/199; 382/255; 382/274; 382/299; 356/124.5

(58) Field of Classification Search ................ 382/199, 382/286; 356/124, 124.5
See application file for complete search history.

(56) References Cited

U.S. PATENT DOCUMENTS

| | | | |
|---|---|---|---|
| 4,979,819 A * | 12/1990 | Humbel et al. | 356/124 |
| 4,993,831 A * | 2/1991 | Vandenberg et al. | 356/124 |
| 5,818,572 A * | 10/1998 | Pappas et al. | 356/124.5 |
| 6,130,750 A | 10/2000 | Ausschnitt et al. | |
| 6,535,221 B1 | 3/2003 | Allen et al. | |
| 6,707,937 B1 | 3/2004 | Sobel et al. | |
| 7,130,469 B2 * | 10/2006 | Adachi | 382/224 |
| 2004/0150734 A1 | 8/2004 | Sobel et al. | |
| 2004/0190030 A1 | 9/2004 | Foster et al. | |
| 2005/0254041 A1* | 11/2005 | Sadoulet et al. | 356/124 |

FOREIGN PATENT DOCUMENTS

EP    0715206    6/1996

OTHER PUBLICATIONS

Samei and Flynn, "A Method for Measuring the Presampled MTF of Digital Radiographic Systems Using an Edge Test Device", 1998 American Assocation Phys. Med., Med. Phyx. 25 (1) Jan. 1998.*
Samei and Flynn, "An Experimental Comparison of Detector Performance for Direct and Indirect Digital Radiography Systems", 2003 Amer. Assoc. Phys. Med., Med. Phys. 30 (4) Apr. 2003.*

(Continued)

*Primary Examiner*—Matthew C Bella
*Assistant Examiner*—Nathan Bloom
(74) *Attorney, Agent, or Firm*—Ware, Fressola, Van Der Sluys & Adolphson, LLP

(57) ABSTRACT

A method for use in characterizing a digital imaging system (53) having an array of imaging elements (35), and in particular for measuring the modulation transfer function (sometimes called the spatial frequency response) even in directions (33) at large angles to both horizontal rows and vertical columns of the array of imaging elements (35), wherein at large angles compared to either horizontal rows or vertical columns of the array of imaging elements (35)—and even at angles other than for directions lying along a diagonal to the array of imaging elements—only non-interpolated readings of the imaging elements (35) are used in determining a supersampled characterization of the digital imaging system (53).

32 Claims, 3 Drawing Sheets

OTHER PUBLICATIONS

Estribeau, "Fast MTF Measurement of CMOS Imagers Using ISO 12233 Slaned-Edge Technology", Proceedings of SPIE vol. 5251, Feb. 2004 pp. 243-252.*

Saunders and Samei, "A Method for Modifying the Image Quality Parameters of Digital Radiographic Images", 2003 Amer. Assoc. Phys. Med., Med. Phys. 30 (11), Nov. 2003.*

Ghosal and Mehrotra, "Edge Detection Using Orthogonal Moment-Based Operators", Pattern Recognition 1992 vol. 3 Conference C: Image, Speech and Signal Analysis, Proceedings., 11th IAPR International Conference.*

Lyvers et. al., "Subpixel Measurements Using A moment-based Edge Operator", IEEE 1989, Transactions on Pattern Analysis and Machine Intelligence vol. 11 Issue 12.*

Don Williams, "Benchmarking of the ISO 12233 Slanted-edge Spatial Frequency Response Plug-in", IS&T's 1998 PICS Conference. pp. 133-136.*

*Edge operator error estimation incorporating measurements of CCD TV camera transfer function*; R.C. Staunton, et al.; IEEE Proc.-Vis. Image Signal Process, vol. 145, No.3 , Jun. 1998, pp. 1-7.

*Accuracy of a simple method for deriving the presampled modulation transfer function of a digital radiographic system from an edge image*; Egbert Buhr et al.; 2003 Am. Assoc. Phys. Med. 2323; pp. 1-9.

*Evaluation of an algorithm for the assessment of the MTF using an edge method*; P.B. Greer, et al.; 2000 Am. Assoc. Phys. Med. 2048; pp. 1-12.

SPIE-IS&T/vol. 5294, Richard L. Baer, Agilent Laboratories, 3500 Deer Creek Rd., Palo Alto, CA, *The Circular-Edge Spatial Frequency Response Test*.

Optical Engineering/Feb. 1991/vol. 30 No. 2, Stephen E. Reichenbach et al., University of Neb.-Lincoln, Computer Science and Eng. Dept., Lincoln, Neb., *Characterizing digital image acquisition devices*.

ISO 12233-2000(E), First Edition Sep. 1, 2000, *Photography—Electronic still-picture cameras—Resolution measurements*.

Eastman Kodak Co., Electronic Imaging Conf., 2004, Peter Burns and Don Williams, *Practical MTF Metrology for Digital Cameras and Scanners*.

* cited by examiner

METHOD FOR CHARACTERIZING A DIGITAL IMAGING SYSTEM

TECHNICAL FIELD

The present invention pertains to the field of digital imaging. More particularly, the present invention pertains to measurements related to the optical transfer function of a digital imaging system.

BACKGROUND ART

The prior art—and in particular ISO 12233, "PHOTOGRAPHY—ELECTRONIC STILL PICTURE CAMERAS—RESOLUTION MEASUREMENTS," first edition, published Sep. 1, 2001—describes a technique for estimating a modulation transfer function (MTF) in the horizontal or vertical direction of a digital camera based on imaging a sharp edge slightly slanted when compared with the MTF measurement direction. An MTF is, in brief, the ratio of the image modulation to the object modulation at all spatial frequencies, i.e. as a function of spatial frequency or, in other words, as a function of e.g. lines per unit distance, and can be different in different directions in the image, and so is usually provided along a particular direction. FIG. 1 shows an example of a MTF for an imaging system. The MTF is the Fourier transform of what is called the line spread function, which indicates the variations in intensity in an image produced by an imaging system when imaging a line. The line spread function is the one-dimensional counterpart to what is called the point spread function, which indicates the variations in intensity in an image produced by an imaging system when imaging a point. The MTF is sometimes referred to as the spatial frequency response (SFR), as in ISO12233. More generally, the MTF (and so the SFR) is the magnitude of the (usually complex-valued) optical transfer function.

The method described in ISO 12233 was intended for use for characterizing digital imaging systems using a two-dimensional array of columns and rows of imaging elements, i.e. charge-coupled devices (CCDs) or other kinds of devices such as complementary metal oxide semiconductor (CMOS) devices, all called here pixels, that respond to light in proportion to the intensity of the light by storing a corresponding amount of charge, the value of which is read in providing a human-readable/viewable image.

(The actual pixel values in the image are typically produced from the values read out from the imaging element by applying some amount of image data processing. In particular, as defined also in ISO 12233, the MTF algorithm typically first linearizes the image data. Because image sensor response typically has a nonlinear correspondence between object luminance and image data values, the edge response of the image can be distorted. When the nonlinear response is known, the image data can be corrected to have a linear response, thus making MTF results more comparable in different regions of the image.)

The slightly slanted edge method of ISO 12233 is, in brief, as follows: First, a slightly slanted edge (say nearly vertical, with perhaps a 5-degree slant) is imaged by the digital imaging system being characterized so as to cause each of the imaging elements of the array to provide as an output a signal corresponding to the amount of light arriving at the imaging element during the imaging process. Each row of imaging elements (horizontal scan line) from a small area across the imaged edge gives an approximation to the edge spread function of the system. The line spread functions are obtained by differentiating the edge spread functions. The centroids of the line spread functions are computed to give an estimate of the location of the edge on each scan line. To smooth the data a straight line is fit to the centroid positions. In what amounts to a process of projecting the data along the edge onto a single horizontal line and thereby average/supersample the smoothed edge spread functions, each horizontal scan line is then translated by the amount estimated from the fit, and a supersampled (e.g. by a factor of four) edge spread function is then obtained by binning the translated scan lines (i.e. by putting groups of four outputs in a respective bin). Differentiation then gives a supersampled line spread function. The MTF is then obtained as the Fourier transform of the supersampled line spread function. So first edge spread functions are determined for each scan line, then smoothed, then averaged, and then a line spread function is determined, which is finally transformed into the MTF—called the SFR in ISO 12233—and might be expressed as lines per unit distance able to be displayed by the imaging system (hence the "spatial frequency" terminology).

As indicated, ISO 12233 requires that the slanted edge be only slightly slanted (with respect to either the horizontal rows of a digital imaging system, or with respect to the vertical columns). Thus, ISO 12233 allows estimating only horizontal and vertical slices of an MTF. However, in order to obtain a good description of the optics of a digital camera, measurements in other directions are useful.

What is needed is a way to estimate for a digital imaging system slices of the MTF at arbitrary angles relative to the rows or columns of the imaging elements. The prior art—Reichenbach, et al., CHARACTERIZING DIGITAL IMAGE ACQUISITION DEVICES, Optical Engineering, Vol. 30, No. 2, February 1991—provides a method for making diagonal measurements, and, in principle, measurements at an arbitrary angle. However, Reichenbach discloses simply "assembling scans" at an appropriate angle (see section 3.2), in what is there called a "knife edge" method. A scan therefore contains pixels from different rows and columns of the sensor/array of imaging elements of the digital imaging system. If the knife edge is arranged at a 45 degree angle, the scans are also at 45 degrees, and so provide pixel values at regularly spaced intervals, but at a spacing larger than the horizontal or vertical spacing of the imaging elements. The larger distance between the pixels of such a scan needs to be taken into account, but after that it is possible to use the standard algorithm. For scan lines at other than 45 degrees, however, interpolation may be needed because pixels do not necessarily lie along the scan lines. However, interpolation can introduce an additional factor contributing to the overall MTF, a factor that is purely an artifact of the measurement process.

Thus, what is really needed is a way to estimate for a digital imaging system slices of the MTF at arbitrary angles relative to the rows or columns of the imaging elements, without degrading the measurement of the MTF by the measurement process itself.

DISCLOSURE OF THE INVENTION

In a first aspect of the invention, a method is provided for characterizing a digital imaging system, comprising: determining an approximate location of an edge in at least a region of interest of an image acquired by the digital imaging system, based on readings of imaging elements in an array of imaging elements included in the digital imaging system; and determining a supersampled characterization of the digital imaging system along a line approximately perpendicular to the edge; wherein in characterizing the digital imaging system at large angles compared to either horizontal rows or vertical columns of the array of imaging elements, and at angles other than for directions lying along a diagonal to the array of imaging elements, only non-interpolated readings are used in determining the supersampled characterization of the digital imaging system.

In accord with the first aspect of the invention, interpolated readings may be used in determining the approximate location of the edge, and further, the interpolated readings may be determined at regular distances along a set of lines approximately perpendicular to the edge. Also in accord with the first aspect of the invention, the supersampled characterization of the digital imaging system may be a supersampled edge spread function. Also in accord with the first aspect of the invention, the non-interpolated readings may be determined at irregularly spaced points on a line approximately perpendicular to the edge. Still also in accord with the first aspect of the invention, the method may further comprise binning the non-interpolated imaging element readings so as to obtain regularly spaced averaged or combined readings. Also, the region of interest may be rectangular having two opposing sides approximately parallel to the edge. Also still, non-interpolated readings may be used in determining the approximate location of the edge. Also, the region of interest may be rectangular having two opposing sides approximately parallel to either horizontal rows or vertical columns of imaging elements in the array of imaging elements. Still also in accord with the first aspect of the invention, in determining the approximate location of the edge, a projection of information indicating the response of the digital imaging system to the edge may be made in a direction aligned with either horizontal rows or vertical columns of imaging elements in the array of imaging elements, thereby eliminating the need to use interpolated readings of imaging elements.

In a second aspect of the invention, a computer program product is provided, comprising a computer readable storage structure embodying computer program instructions thereon, by which a computer processor is enabled to perform the steps of a method according to the first aspect of the invention.

In a third aspect of the invention, an apparatus is provided comprising means for performing the steps of a method according to the first aspect of the invention.

In a fourth aspect of the invention, a system is provided, comprising: a digital imaging system, for providing readings corresponding to an image including an edge; and an apparatus according to the third aspect of the invention, and responsive to the readings, for providing information characterizing the digital imaging system based on the readings corresponding to the image.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

The invention provides at least two related methods for characterizing a digital imaging system in terms of a modulation transfer function (MTF)/spatial frequency response (SFR) for directions at large angles to the horizontal or vertical columns of the imaging elements (pixels) used for providing a human-readable/viewable image (by a process including a step of "reading" the imaging elements). In each method, a region of interest (ROI) encompassing a subset of the imaging elements is defined, and it is different in the two methods. In the first method the ROI is a rotated rectangle (rotated by the measurement angle). In the second method the ROI is a rectangle with horizontal and vertical sides.

Figure 1:
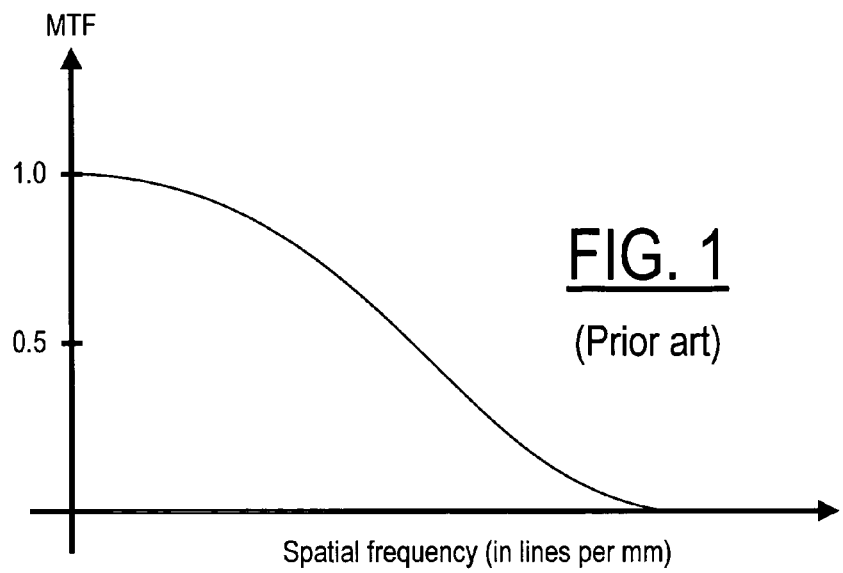
FIG. 1 is a graph showing a fictitious modulation transfer function, for illustration only.
Figure 2:
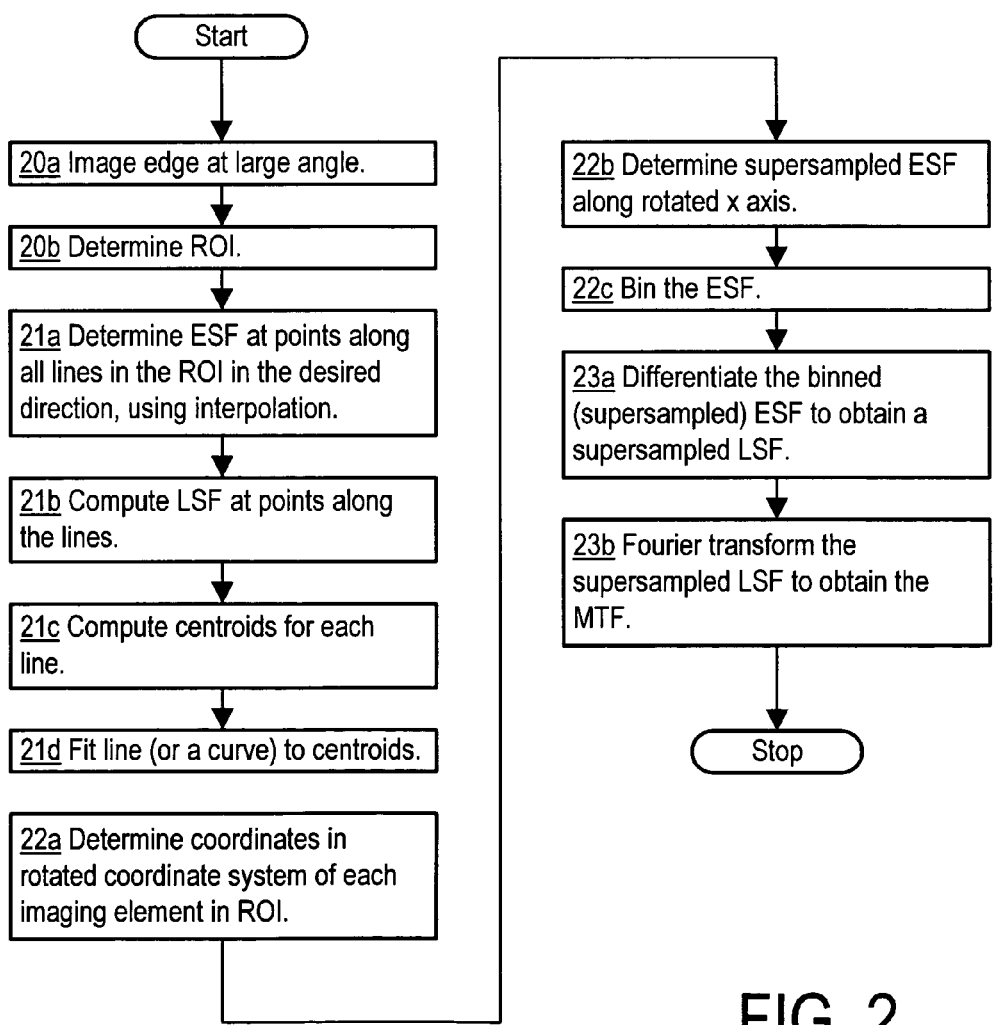
FIG. 2 is a flow chart of a method according to the invention.
Figure 3:
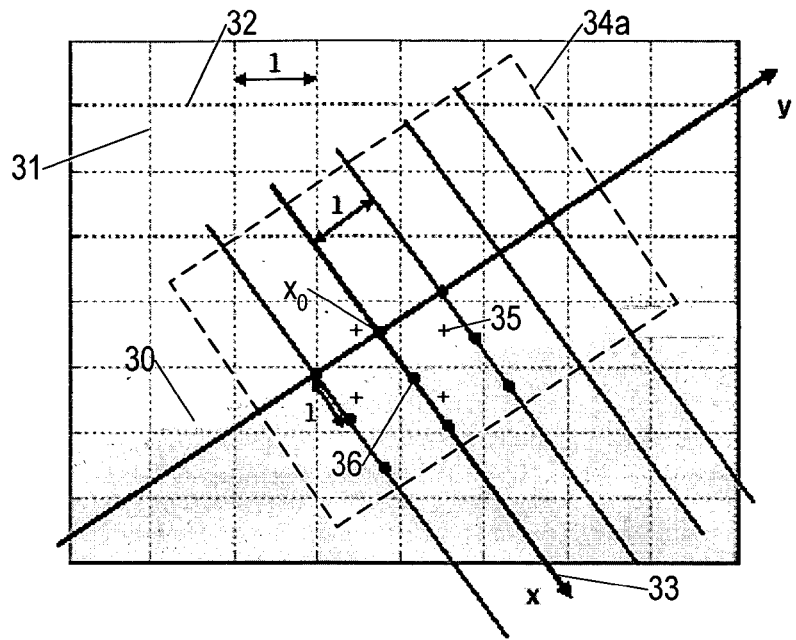
FIGS. 3 and 4 are examples of an image of an edge such as would be analyzed by the method illustrated in FIG. 2.
Figure 4:
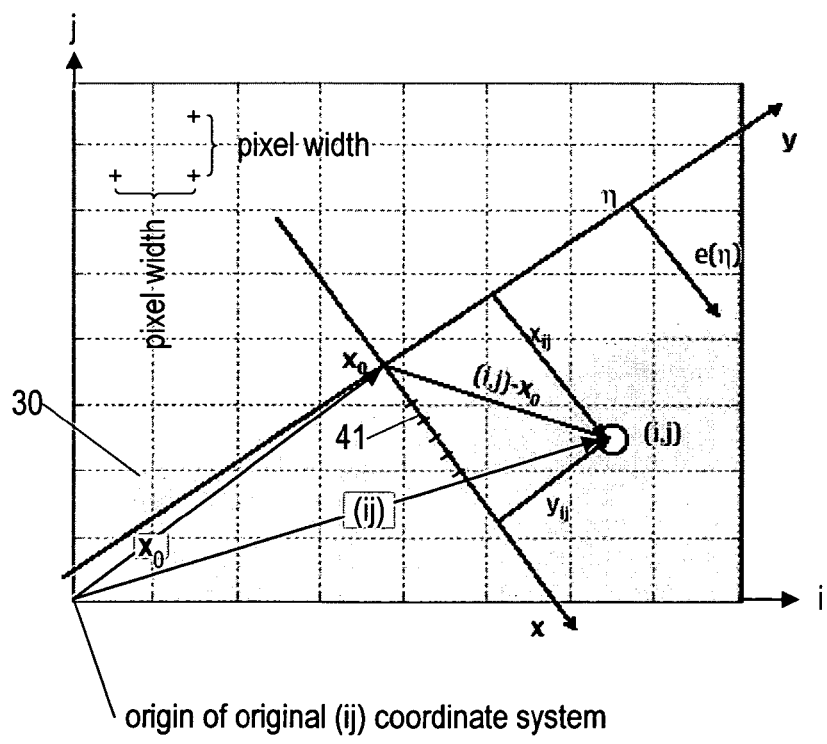

Referring now especially to FIG. 2 but also to FIGS. 3 and 4, in the first method, in a first step 20a, an edge 30 (FIG. 3) is imaged through the system, with the edge at a large angle to the vertical lines 31 or horizontal lines 32 of imaging elements—sometimes called here scan lines—and having an orientation approximately perpendicular to the desired MTF measurement direction 33; the angle of the edge is defined here to be the smaller of the angle with respect to the columns (of imaging elements) and the rows. In practice the image may be large and only a small ROI near the edge may be used. Also, the edge may be the edge of an object in a test pattern including many different objects of varying shapes and orientations, such as is used in measurements according to ISO 12233. The edge should be at a large angle, but at an angle of other than within about two degrees of a diagonal (45 degrees). The method can also be used down to angles as small as about two degrees from the horizontal or vertical. It should be emphasized that the above does not restrict the actual measurement angle at which the method is applied, only the angle of the edge. The measurement angle (same as angle of the rotated coordinate system) can be completely arbitrary; the edge direction should be roughly perpendicular to it (it can also be exactly perpendicular), but with the exceptions mentioned above.

In a next step 20b, an ROI 34a is determined, rectangular in shape, but having two sides perpendicular to the direction in which a measurement of the MTF is desired, and two sides parallel to the desired direction.

In a next step 21a, values of the so-called edge spread function (ESF)—sometimes called the edge response function, and comprising the readings of the imaging elements lying in a line crossing perpendicular to the edge, or related/interpolated values—are computed at usually equally spaced points along lines in the ROI in the direction for which a measurement of the MTF is desired. (The values—which are the readings of the imaging elements—are said to be interpolated in the sense that values are assigned to points in the ROI where there is no pixel center, based on readings of pixels near the point.) The desired direction is taken as defining the direction of the x-axis of a coordinate system rotated from a coordinate system in which the x-axis lies along the direction of either the vertical or horizontal scan lines 31 32. Thus, in the rotated coordinate system, the x-axis is roughly perpendicular to the edge, and the y-axis is roughly along the edge. In computing the ESF along the lines in the desired direction, and so in the x-direction of the rotated coordinate system, the ESF is computed at equally spaced points along the lines, and since the points on the lines do not line up with the imaging elements in the ROI, i.e. with the pixels in the image, interpolation of the image data is used to find an approximate value for the ESF for a point on the line. Different kinds of interpolation can be used. For example, bilinear interpolation can be used, based on the four pixels that surround a point on a line. Referring now in particular to FIG. 3 where the underlying grid of vertical and horizontal scan lines corresponds to the array of imaging elements/pixels 35 in the image (at the positions indicated by the crosses 35), for bilinear interpolation to determine the ESF at a point 36 on the line 33, a value for the ESF is computed using a linear combination of the values of the ESF at each of the four imaging elements/pixels 35 closest to the point 36 (indicated by the four crosses in FIG. 3), weighted based on the distance of each to the point 36.

As one illustration of how the bilinear interpolation can be performed, assume point 36 has coordinates (x,y) in the rotated coordinate system. The corresponding coordinates in the original (i,j) system are computed by an appropriate rotation of the (x,y) values; say the result after rotation is (x1,y1). Let $i1 = \text{floor}(x1)$ (greatest integer less than or equal to $x1$)

$j1 = \text{floor}(y1)$, $t = x1 - i1$ (fractional part), and $s = y1 - j1$.

Then the surrounding pixels 35 in the original image are those with coordinates (i1,j1), (i1+1,j1), (i1,j1+1), and (i1+1,j1+1), and the value used for the ESF at point 36 is computed as:

$(1-t)(1-s)P[i1,j1] + t(1-s)P[i1+1,j1] + (1-t)sP[i1,j1+1] + tsP[i1+1,j1+1]$, where P[i,j] is the value of the original image pixel at (i,j). (Other interpolation methods can of course be used.)

In a next step 21b, e.g. in the same way as is done in ISO 12233, the so-called line spread function (LSF) is computed at each point where the ESF was computed (except at one or more end points on each line), by (numerically) differentiating the edge spread functions. (The LSF could also be evaluated at fewer points, using more points where the ESF is defined in computing each derivative.)

In a next step 21c, e.g. again as in e.g. ISO 12233, a centroid for each line is determined, i.e. what might be described as a center of amplitude along each line is determined (in the same way a center of a mass distribution along a line would be determined).

In a next step 21d, e.g. again as in e.g. ISO 12233, a straight line (or a curve of some predetermined general form, such as a parabola or a curve corresponding to some polynomial other than for a parabola) is fit to the centroid data, thus providing an estimate of the location of the edge. (In case there is geometric distortion in the image—e.g. arising from optical distortion in the lens—the straight line may be imaged as a slightly curved line. Fitting a parabola can in effect straighten the edge and improve the accuracy of the measured SFR. The algorithm does not change in any other way.)

In a next step 22a, and now referring in particular to FIG. 4, the respective coordinates $(x_{ij}, y_{ij})$ of the imaging elements in the ROI according to the rotated coordinate axes (xy) are determined in terms of the corresponding coordinates in the un-rotated coordinate system having coordinate axes (ij). As can be seen from FIG. 4, the coordinates in the rotated coordinate system can be determined taking the scalar product of the (two-dimensional) vector in the rotated coordinate system, i.e. $((i,j) - x_0)$, in each of the two orthogonal directions defining the axes of the rotated coordinate system:

$x_{ij} = ((i,j) - x_0)^T x$, and $y_{ij} = ((i,j) - x_0)^T y$.

In a next step 22b, a supersampled ESF is provided along the x axis, using the imaging element output $p_{ij}$ of the pixel at (ij) for the value of the ESF at the point $x_{ij} - e(y_{ij})$ along the x axis, where (see FIG. 4), $e(\eta)$ is the distance from the x axis to the edge (per the line or curve fitted to the centroids) at the point $\eta$ along the y axis. The supersampled ESF data is thus defined on a line at points spaced unevenly along the line.

In a next step 22c, the supersampled ESF is binned, i.e. all values of the ESF falling into the same bin according to the value of $x_{ij} - e(y_{ij})$ are lumped together (and possibly averaged). For example, and as shown in FIG. 4, four bins 41 for each pixel width (measured from one pixel to a closest neighbor pixel, and so in the horizontal or the vertical direction from the one pixel) can be used along the x axis, giving data along the x axis spaced uniformly at a distance of ¼ of the pixel width.

In a next step 23a, e.g. as in ISO 12233, the supersampled ESF is differentiated to obtain a supersampled LSF, and in a last step 23b, again e.g. as in ISO 12233, the LSF is Fourier transformed to obtain an estimate of the MTF along the direction of the x axis.

Thus, although the invention uses interpolation in estimating the location of the edge, non-interpolated imaging element readings are used in providing a supersampled ESF, and in all subsequent steps.

In the second embodiment, the ROI is taken to be a rectangular area having sides aligned with column and row directions of the array of imaging elements. The edge position is estimated by calculating centroids based on values for the LSF along either horizontal rows or vertical columns, depending on which of the two directions is closer to the edge normal. Because the LSF is calculated along rows or columns, interpolated values need not to be used, but the obtained LSF is the projection of the actual LSF in either the horizontal or vertical axis direction. However, as the LSF can be assumed to be uniform along the edge, centroids still give a good estimate of the edge position. (As before, a best linear or other polynomial fit to the centroid positions is then used to finally estimate the edge position.) The supersampling (without using interpolated values) and averaging of the edge spread function is done in essentially the same way as in the first embodiment, using the rotated coordinate system in which one of the axes is aligned with the estimated edge position, and using all the values in the ROI.

Thus, the second method is similar to the ISO 12233 method in how the edge location is found, but yet different. The difference is that instead of using actual ESF values (and corresponding LSF values), the second method uses projections of the ESF (and so the LSF) in the horizontal/vertical axis direction (depending on which is closer to the desired direction for the MTF). As we can assume that ESF and LSF depend only on distance from edge, a linear coordinate transformation (distance from edge multiplied by inverse cosine) is used to relate the real ESF & LSF to the projections used in the second method. If the angle is small, the cosine factor can be taken as equal to unity, and the result is, numerically but not procedurally, the same as the ISO 12233 method. (Since in the second embodiment projections parallel to the edge itself are used in arriving at a supersampled ESF, the MTF that results is for a direction exactly perpendicular to the edge, not along the line 33 of FIG. 3. In other words, the second embodiment uses a rotated coordinate system too, but with one axis aligned with the edge direction.)

The second embodiment can be viewed as essentially a variation of the first embodiment. Other variations can be used, mixing the approaches of the two methods. For example, the first embodiment may be used with the only change of having the ROI aligned with the original horizontal and vertical axes. Alternatively, the first embodiment may only apply the edge-finding approach of the second embodiment, using LSF projections along rows and columns to calculate centroid positions. The first embodiment can also use a rotated coordinate system aligned with the edge direction (found by one technique or another).

Thus different alternative embodiments of the invention can be used, based on the two embodiments described above, and different combinations of their approaches. In all embodiments according to the invention, however, the image is sampled in a selected ROI containing the edge, the image data is used to locate the edge position, and a supersampled ESF is then produced from the image data in a direction close to the normal to the edge direction, as described by steps 22a to 22c in the first embodiment.

As explained above, the invention provides a method for characterizing an digital imaging system; it also provides corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code—i.e. the software or firmware—thereon for execution by a computer processor.

Figure 5:
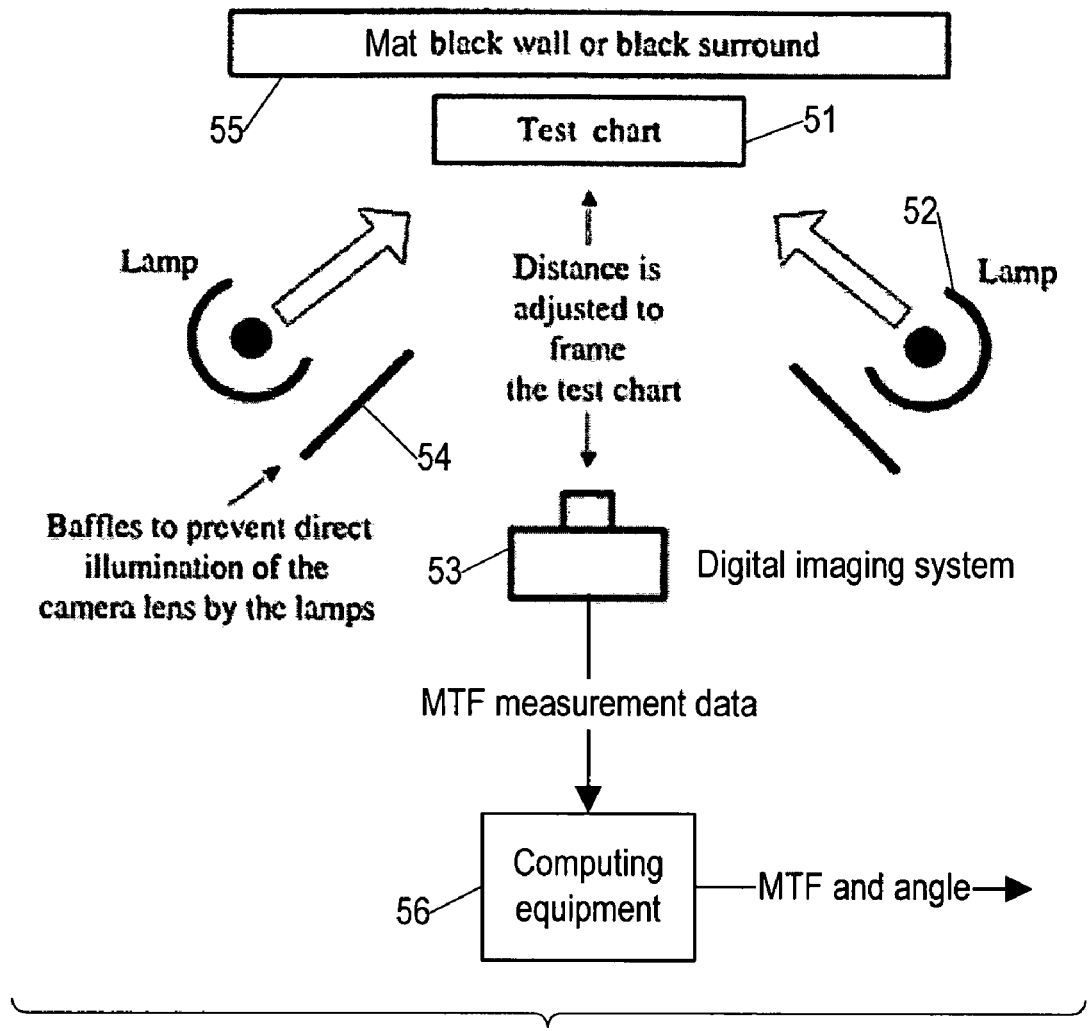
FIG. 5 is a block diagram/flow diagram of a system according to the invention (and also according to the prior art) for characterizing a digital imaging system (part of the system).

The test conditions for a measurement according to the invention can be as set out in the ISO 12233 for a measurement according to the method described there, except that the edge being imaged is oriented to have a substantially larger slant angle, as described above. Thus, and now referring to FIG. 5, the edge can be indicated on a test chart 51 at some measured distance from a digital imaging system 53, illuminated by lamps 52 so as to have an acceptable luminance, everywhere on the test chart (e.g. so that the luminance of any white area of the chart is within 10% of the average luminance near the center of the chart). Baffles 54 should be used to prevent light from the lamps 52 from shining directly on the lens of the digital imaging system 53. Finally, a mat black wall 55 should be placed in back of the test chart, or other measures should be taken to arrange that the area around the test chart is of low reflectance, to minimize flare light. The camera should be focused at various settings to determine the most suitable setting for the measurement (i.e. e.g. the setting that provides the highest average modulation level at a spatial frequency of about ¼ the Nyquist frequency of the digital imaging system, the Nyquist frequency being that spatial frequency—or lines per unit distance—at which the MTF is so small as to be negligible).

Besides the focusing, other digital imaging system/camera settings—such as related to image compression—should be adjusted to provide a near maximum signal from the white test target areas. Also, for a color camera, the camera white balance should be adjusted to provide approximately equal red, green and blue signal levels for the illumination light source. If the camera does not provide a luminance output signal, which is what is ordinarily read in determining ESF values, a suitable combination of readings of the color records should be made, instead of using only readings for one color, i.e. e.g. from only the green channel. Finally, if the signal representing the image is a non-linear function of the scene luminance values, then a so-called gamma correction should be made, as set out in ISO 12233.

The readings of the imaging elements (i.e. e.g. data indicating the reading for each imaging element) is thus acquired and stored in the digital imaging system 53. Those readings—or in other words the MTF measurements data—are then transferred to computing equipment 56 as input for performing the analysis according to the invention using either of the two methods described above, and the angle of the measurement (determined from the readings themselves) and the corresponding estimated MTF are provided as output.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for characterizing a digital imaging system, comprising:
   in a processor, performing the steps of:
       determining an approximate location of an edge in at least a region of interest of an image acquired by the digital imaging system, based on reading of imaging elements in an array of imaging elements included in the digital imaging system; and
       determining a supersampled characterization of the digital imaging system along a line approximately perpendicular to the edge;
       wherein in characterizing the digital imaging system at large angles compared to either horizontal rows or vertical columns of the array of imaging elements, and at angles other than for directions lying along a diagonal to the array of imaging elements, only non-interpolated readings are used in determining the supersampled characterization of the digital imaging system, and wherein the non-interpolated readings are derived from a two-dimensional region by determining coordinates of each imaging element in the at least one region of interest.

2. A method as in claim 1, wherein interpolated readings are used in determining the approximate location of the edge.

3. A method as in claim 2, wherein the interpolated readings are determined at regular distances along a set of lines approximately perpendicular to the edge.

4. A method as in claim 1, wherein the supersampled characterization of the digital imaging system is a supersampled edge spread function.

5. A method as in claim 1, wherein the non-interpolated readings are determined at irregularly spaced points on a line approximately perpendicular to the edge.

6. A method as in claim 1, further comprising binning the non-interpolated imaging element readings so as to obtain regularly spaced averaged or combined readings.

7. A method as in claim 1, wherein the region of interest is rectangular having two opposing sides approximately parallel to the edge.

8. A method as in claim 1, wherein non-interpolated readings are used in determining the approximate location of the edge.

9. A method as in claim 1, wherein the region of interest is rectangular having two opposing sides approximately parallel to either horizontal rows or vertical columns of imaging elements in the array of imaging elements.

10. A method as in claim 1, wherein in determining the approximate location of the edge, a projection of information indicating the response of the digital imaging system to the edge is made in a direction aligned with either horizontal rows or vertical columns of imaging elements in the array of imaging elements, thereby eliminating the need to use interpolated readings of imaging elements.

11. A computer program product, comprising a computer readable storage structure embodying computer program instructions thereon, by which a computer processor is enabled to perform the steps of the method of claim 1.

12. An apparatus for characterizing a digital imaging system, comprising:
   means for determining an approximate location of an edge in at least a region of interest of an image acquired by the digital imaging system, based on readings of imaging elements in an array of imaging elements included in the digital imaging system; and
   means for determining a supersampled characterization of the digital imaging system along a line approximately perpendicular to the edge;
   wherein in characterizing the digital imaging system at large angles compared to either horizontal rows or vertical columns of the array of imaging elements, and at angles other than for directions lying along a diagonal to the array of imaging elements, only non-interpolated readings are used in determining the supersampled characterization of the digital imaging system, and wherein the non-interpolated readings are derived from a two-dimensional region by determining coordinates of each imaging element in the at least one region of interest.

13. An apparatus as in claim 12, wherein interpolated readings are used in determining the approximate location of the edge.

14. An apparatus as in claim 13, wherein the interpolated readings are determined at regular distances along a set of lines approximately perpendicular to the edge.

15. An apparatus as in claim 12, wherein the supersampled characterization of the digital imaging system is a supersampled edge spread function.

16. An apparatus as in claim 12, wherein the non-interpolated readings are determined at irregularly spaced points on a line approximately perpendicular to the edge.

17. An apparatus as in claim 12, further comprising means for binning the non-interpolated imaging element readings so as to obtain regularly spaced averaged or combined readings.

18. An apparatus as in claim 12, wherein the region of interest is rectangular having two opposing sides approximately parallel to the edge.

19. An apparatus as in claim 12, wherein non-interpolated readings are used in determining the approximate location of the edge.

20. An apparatus as in claim 12, wherein the region of interest is rectangular having two opposing sides approximately parallel to either horizontal rows or vertical columns of imaging elements in the array of imaging elements.

21. An apparatus as in claim 12, wherein in determining the approximate location of the edge, a projection of information indicating the response of the digital imaging system to the edge is made in a direction aligned with either horizontal rows or vertical columns of imaging elements in the array of imaging elements, thereby eliminating the need to use interpolated readings of imaging elements.

22. A system, comprising:
   a digital imaging system, for providing readings corresponding to an image including an edge; and
   an apparatus as in claim 12, responsive to the readings, for providing information characterizing the digital imaging system based on the readings corresponding to the image.

23. An apparatus comprising a processor for characterizing a digital imaging system, wherein the processor is configured for:
   determining an approximate location of an edge in at least a region of interest of an image acquired by the digital imaging system, based on readings of imaging elements in an array of imaging elements included in the digital imaging system; and
   determining a supersampled characterization of the digital imaging system along a line approximately perpendicular to the edge;
   wherein the processor is further configured so that in characterizing the digital imaging system at large angles compared to either horizontal rows or vertical columns of the array of imaging elements, and at angles other than for directions lying along a diagonal to the array of imaging elements, only non-interpolated readings are used in determining the supersampled characterization of the digital imaging system, and wherein the non-interpolated readings are derived from a two-dimensional region by determining coordinates of each imaging element in the at least one region of interest.

24. An apparatus as in claim 23, wherein the processor is configured so that interpolated readings are used in determining the approximate location of the edge.

25. An apparatus as in claim 24, wherein the processor is configured so that the interpolated readings are determined at regular distances along a set of lines approximately perpendicular to the edge.

26. An apparatus as in claim 23, wherein the supersampled characterization of the digital imaging system is a supersampled edge spread function.

27. An apparatus as in claim 23, wherein the processor is configured so that the non-interpolated readings are determined at irregularly spaced points on a line approximately perpendicular to the edge.

28. An apparatus as in claim 23, wherein the processor is further configured for binning the non-interpolated imaging element readings so as to obtain regularly spaced averaged or combined readings.

29. An apparatus as in claim 23, wherein the region of interest is rectangular having two opposing sides approximately parallel to the edge.

30. An apparatus as in claim 23, wherein the processor is configured so that non-interpolated readings are used in determining the approximate location of the edge.

31. An apparatus as in claim 23, wherein the region of interest is rectangular having two opposing sides approximately parallel to either horizontal rows or vertical columns of imaging elements in the array of imaging elements.

32. An apparatus as in claim 23, wherein the processor is configured so that in determining the approximate location of the edge, a projection of information indicating the response of the digital imaging system to the edge is made in a direction aligned with either horizontal rows or vertical columns of imaging elements in the array of imaging elements, thereby eliminating the need to use interpolated readings of imaging elements.

* * * * *